United States Patent Office 2,985,680
Patented May 23, 1961

2,985,680
NITRO AND NITRITO DERIVATIVES OF ORGANOSILICON COMPOUNDS

Enrico J. Pepe, Kenmore, N.Y., assignor to Union Carbide Corporation, a corporation of New York No Drawing. Filed Aug. 3, 1959, Ser. No. 831,049

11 Claims. (Cl. 260—448.8)

This invention is related to novel organosilicon compounds and to a process for their production. More particularly, this invention relates to organosilicon compounds containing a nitro or nitrito group interconnected to silicon through at least three carbon atoms, as new compositions of matter and to be a process for their production.

The compositions of the instant invention are organosilicon compounds which contain at least one silicon atom and at least one group of the formula:

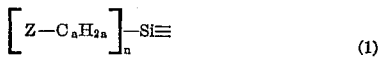
(1)

wherein Z is a member of the class consisting of nitrito and nitro groups, $(a)$ is an integer having a value of at least 3 and is preferably from 3 to 18, $(n)$ is an integer of from 1 to 3, each silicon atom is bonded to from 1 to 3 oxygen atoms, each silicon bonded oxygen atom being bonded to either a silicon atom or a carbon atom of an alkyl group and each remaining unfilled valence of all silicon atoms is satisfied by no other group than a monovalent hydrocarbon radical. Thus the compositions of this invention are the monomeric silanes and the polymeric siloxanes. The organosilicon compounds can also be called nitro- or nitrito-alkylsilicon compounds.

The compositions of this invention which are monomeric are the organosilanes represented by the formula:

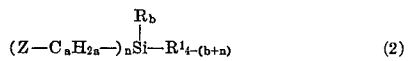
(2)

where Z and $(a)$ are as above defined, R is a monovalent hydrocarbon radical, $R^1$ is an alkoxy group, $(n)$ is an integer of from 1 to 3, $(b)$ is an integer of from 0 to 2, and the sum of $b$ and $n$ is from 1 to 3. Illustrative of the novel nitro and nitrito containing organosilanes of this invention are: 3-nitropropyltriethoxysilane, 4 - nitrobutyltributoxysilane, 11 - nitroundecylmethyldiethoxysilane, 3 - nitropropylphenyldimethoxysilane, 4-nitrobutyldiethylethoxysilane, 3-nitrobutyldiphenylmethoxysilane and the like; and 3-nitritopropyltriethoxysilane, 3 - nitritobutyltrimethoxysilane, 4 - nitritobutylmethyldiethoxysilane, 11-nitritodecylphenyldimethoxysilane, 4-nitritohexyldiphenylethoxysilane and the like. Illustrative of the monovalent hydrocarbon radicals that R can represent are alkyl groups such as methyl, ethyl, butyl and the like; alkenyl groups such as vinyl, allyl and the like; aryl groups such as phenyl, naphthyl and the like; aralkyl such as phenyl ethyl and the like; and alkaryl such as tolyl and the like. Illustrative of the alkoxy groups the $R^1$ can represent are methoxy, ethoxy, butoxy, stearoxy and the like.

The compositions of this invention also include the polymeric organosiloxanes containing at least one unit of the formula:

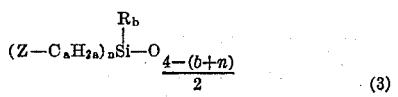
(3)

wherein R, Z, $(a)$, $(b)$ and $(n)$ have the above-defined meanings. These polymeric organosiloxanes include trifunctional organosiloxanes, difunctional organosiloxanes and monofunctional organosiloxanes. The organosiloxanes of this invention that are trifunctional in regard to the silicon atom (i.e. where $b=0$ and $n=1$) include cross-linked organopolysiloxanes, for example, 4-nitrobutylpolysiloxane, 4-nitritobutylpolysiloxane, 3-nitropropylpolysiloxane, 3-nitritopropylpolysiloxane and the like. Organosiloxanes of this invention which are difunctional in regard to the silicon atom (i.e. where the sum of $b$ and $n$ is 2) include the linear organosiloxanes, for example, 3-nitritopropylphenylpolysiloxane, 3-nitropropylmethylpolysiloxane, 4-nitritobutylphenylpolysiloxane, 3-nitrobutylethylpolysiloxane and the like. The organosiloxanes which are difunctional in regard to the silicon atom (i.e. where $b=1$) also include cyclic organosiloxanes of the formula:

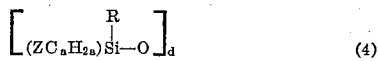
(4)

wherein R, Z and $(a)$ have the above-defined meanings and $(d)$ is an integer of from 3 to 7. These cyclic organosiloxanes are, for example, tetra-3-nitropropyltetraethylcyclotetrasiloxane, penta - 3 - nitritobutylpentaphenylcyclopentasiloxane, hepta - 3 - nitritopropylheptaethylcycloheptasiloxane and the like. The organosiloxanes of this invention which are monofunctional in regard to the silicon atom (i.e. where the sum of $b$ and $n$ is 3) are the dimeric organosiloxanes, for example, bis-(3 - nitropropyl)tetramethyldisiloxane,bis - (3-nitritobutyl)tetraphenyldisiloxane and the like.

The compositions of this invention also include the polymeric organosiloxanes containing at least one unit represented by Formula 3 and one or more units of the formula:

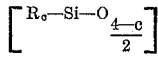

wherein R has the above-defined meaning and $(c)$ is an integer having a value of from 0 to 3, $(c)$ need not have the same value throughout the same molecule and R can represent the same or different groups within the same molecule. Thus, the polymeric organosiloxanes of this invention include end-blocked linear polymeric organosiloxane oils, polymeric cyclic organosiloxanes and polymeric resinous organosiloxanes containing the same or different substituted mono-, di- and tri-functional silicon atoms or the organosiloxanes of this invention can exist as polymeric difunctional organosiloxane gums. Such polymeric organosiloxane oils are those having the formula:

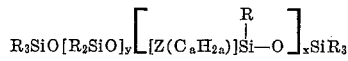

wherein R, Z and $(a)$ have the above-defined meanings, $y$ is an integer and $x$ is an integer of at least 1, and R represents the same or different groups in the same molecule within its meaning as defined above. Such polymeric organosiloxane oils are, for example, trimethylsiloxy end-blocked dimethylsiloxane-3-nitropropylphenylsiloxane oil, triphenylsiloxy end-blocked diphenylsiloxane - 3 - nitritobutylmethysiloxane-diphenylsiloxane oil, tributylsiloxy end-blocked phenylmethylsiloxane-11-nitroundecylmethylsiloxane oil and the like. Such polymeric organosiloxanes also include cyclic organosiloxanes such as, for example, 3-nitropropylheptamethylcyclotetrasiloxane, 4 - nitritobutylpentaphenylcyclotrisiloxane, 3-nitritopropylpropyl nona-methylcyclopentasiloxane and the like.

The compositions of this invention are produced by forming a mixture of a metal nitrite and a silicon compound containing a silicon bonded halosubstituted alkyl group in the presence of a liquid organic compound and maintaining the mixture at a temperature below 50° C. The preferred method of forming the reaction mixture is to mix the metal nitrite and liquid organic compound and then add the silicon compound containing a silicon-bonded, halo-substituted alkyl group in small increments with rapid stirring so as to prevent the reaction temperature from exceeding the preferred limits below. There results or is produced a metal halide and a nitritoalkyl- or nitroalkyl-silicon compound wherein said nitro or nitrito group is interconnected to a silicon atom through at least three carbon atoms. The overall reaction can be depicted by the following equation which, for the purpose of illustration, shows the reaction of silver nitrite with 3-iodopropyltriethoxysilane:

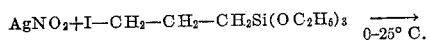
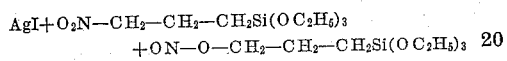

The temperature at which the reaction is conducted can be from about −5° C. to 50° C. It is preferred that the temperature be maintained below 25° C. in order to minimize side reactions which reduce the yield of nitro- and nitrito-alkylsilicon compounds. It is especially preferred to maintain the temperature from about 0° C. to 5° C. during the initial stage of the reaction.

The relative amounts of the silicon compound containing a silicon-bonded, halo-substituted alkyl group and the metal nitrite employed is not narrowly critical and can be varied over a wide range. It is preferred to employ the metal nitrite and the silicon compound containing a silicon-bonded, halo-substituted alkyl group in stoichiometric amounts.

A liquid organic compound is necessary in the process of this invention if reasonable yields of products are to be obtained. The liquid organic compound performs several functions such as: (1) it brings the starting materials into more intimate contact and (2) it serves as a diluent so that the heat of reaction does not cause the temperature to rise above the preferred limits thus giving rise to undesirable side reactions. The liquid organic compound employed should be one in which the starting silicon compound and product organosilicon compound are soluble. It is also preferred that the liquid organic compound be one in which the metal nitrite is at least partially soluble and the metal chloride is insoluble. The liquid organic compound should also be non-reactive toward the starting material and final products. Such liquid organic compounds are, for example, the aromatic hydrocarbons, such as benzene, toluene, xylene and the like, aliphatic hydrocarbons such as pentane, hexane, and the like, alicyclic hydrocarbons such as cyclohexane, cyclopentane, and the like, alkyl and aryl ethers such as diethyl ether, diisopropyl ether, methylphenyl ether, and the like; cyclic ethers such as dioxane, tetrahydrofuran and the like. The amount of the liquid organic compound employed is not narrowly critical and can range from 1 part by weight of the liquid organic compound to 10 parts by weight of reactants to 100 parts by weight solvent to 1 part by weight of reactants. It is preferred to employ from 1 to 4 parts by weight of the liquid organic compound to 1 part by weight of the reactants for ease in isolation of the product and for economy of operation.

The compositions produced by the process of this invention are isolated by first filtering the reaction mixture to remove the metal salts and then by fractional distillation of the filtrate to separate and recover the liquid organic compound and the products of this invention.

The metal nitrites employed in the process of this invention are the nitrites of the metals of group Ia or Ib of the periodic table of chemical elements. It is preferred to employ silver nitrite as the metal nitrite if a high yield of the nitro derivative is to be obtained; whereas, it is preferred to employ sodium nitrite where a high yield of the nitrito derivative is desired.

The silicon compounds containing a silicon-bonded, halo-substituted alkyl group employed as starting materials in the process of this invention are those silicon compounds containing at least one silicon atom and at least one group of the formula:

$$(XC_aH_{2a})_nSi\equiv$$

where X is halogen preferably bromine or iodine, $(n)$ is as above-defined, each silicon atom of the haloalkyl silicon compound is bonded to from 1 to 3 oxygen atoms, each silicon bonded oxygen atom being bonded to either a silicon atom or a carbon atom of an alkyl group and each remaining unfilled valence of all silicon atoms is satisfied by no other group than a monovalent hydrocarbon radical. Thus, for example, the silicon compounds containing a silicon-bonded, halo-substituted alkyl group employed as a starting material include silanes containing a silicon-bonded, halo-substituted alkyl group and siloxanes containing a silicon-bonded halo-substituted alkyl group.

The silanes containing a silicon-bonded, halo-substituted alkyl group that are useful in preparing the compositions of this invention are the silanes of the formula:

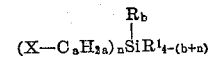

wherein R, $R^1$, X, $(a)$, and $(b)$ and $(n)$ have the above-defined meanings. Examples of such haloalkylsilanes are, 3-iodopropyltriethoxysilane, 3-bromopropyltrimethoxysilane, 4-bromobutyltriethoxysilane and the like; di-(3-iodopropyl)diethoxysilane, 3-iodobutylmethyldiethoxysilane and the like; tri(11-bromoundecyl) ethoxysilane, 3-iodopropyldiphenylmethoxysilane, 4-iodobutylmethylethylethoxysilane and the like.

The polymeric silicon compounds containing a silicon-bonded, halo-substituted alkyl group that are useful in preparing the compositions of this invention include the siloxanes of the formula:

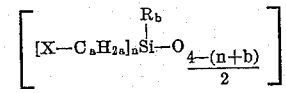

where R, X, $(a)$, $(b)$ and $(n)$ have the above-defined meaning. These siloxanes can be cyclic siloxanes containing a silicon-bonded, halo-substituted alkyl group as well as linear siloxanes containing a silicon-bonded, halo-substituted alkyl group as, for example, where the sum of $n$ and $b$ is 2, the compounds can be in the cyclic form having from 3 to 7 such units or they can be linear having a number of such groupings. These polymeric siloxanes can be prepared by the hydrolysis and condensation of the corresponding silanes. Illustrative of the cyclic siloxanes containing a silicon-bonded, halo-substituted alkyl group suitable for use as starting materials are, for example, tetra(3-iodopropyl)tetramethylcyclotetramethylcyclotetrasiloxane, tetra-(4-bromobutyl)-tetraphenylcyclotetrasiloxane and the like. Illustrative of the linear polysiloxanes containing a silicon-bonded, halo-substituted alkyl group are 3-iodopropylphenylpolysiloxane, 4-bromobutylmethylpolysiloxane, 3-iodobutylethylsiloxane and the like. Where $b$ is 0 and $n$ is 1 in the above formula, the materials are of the trifunctional variety, such as, for example, 3-iodopropylpolysiloxane, 4-bromobutylpolysiloxane and the like. These siloxanes containing a silicon-bonded, halo-substituted alkyl group can have residual alkoxy groups in the siloxane chains. Such siloxanes containing a silicon-bonded, halo-substituted alkyl group and containing residual alkoxy groups can be prepared by the partial hydrolysis and condensation of the corresponding alkoxysilanes.

The polymeric silicon compounds containing a silicon-bonded, halo-substituted alkyl group that are useful in preparing the compositions of this invention also include siloxanes containing the units:

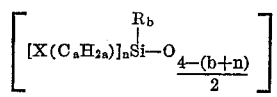

and

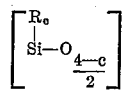

where R, X, $(a)$, $(b)$, $(c)$ and $(n)$ have the above-described values. The polymeric materials suitable for the preparation of the compositions of this invention can obtain various combined siloxane units such as trifunctional siloxane units containing a silicon-bonded, halo-substituted alkyl group (where $n=1$ and $b=0$) with difunctional alkyl-, aryl-, or mixed alkyl- and arylsiloxane units (where $c=2$). These polymers can also contain various combined siloxane units; such as difunctional siloxane units containing a silicon-bonded, halo-substituted alkyl group (where the sum of $n$ and $b$ is 2) with trifunctional alkyl-, aryl- or mixed alkyl and arylsiloxane units (where $c=1$) or with difunctional alkyl-, aryl- or mixed alkyl- and arylsiloxane units (where $c=2$) or with any combination of these units so long as it contains at least one mono-, di-, or trifunctional siloxane unit containing a silicon-bonded, halo-substituted alkyl group. These polymeric silicon compounds containing a silicon-bonded, halo-substituted alkyl group can be prepared by the cohydrolysis and co-condensation of the corresponding alkoxysilane compounds. Such polymers can contain silicon-bonded alkoxy groups, or they can comprise essentially completely condensed materials.

The silanes containing a silicon-bonded, halo-substituted alkyl group and polysiloxanes containing a silicon-bonded, halo-substituted alkyl group as well as polymers containing siloxane units containing a silicon-bonded, halo-substituted alkyl group and hydrocarbylsiloxane units can be prepared by disclosed methods known to those in the art. Thus, for example, silicon compounds containing a silicon-bonded, chlorine or bromine substituted alkyl group are prepared by the direct chlorination or bromination. The silicon compounds containing a silicon-bonded iodo-alkyl group are prepared, for example, by the reaction of a silicon compound containing a chlorine-substituted alkyl group with sodium or potassium iodide in anhydrous acetone.

The compounds of this invention described herein have various uses. The compounds of this invention may be used as intermediates in the preparation of pharmaceuticals and may be used alone as a basis for new silicone resins and, silicone elastomers containing a nitrito or nitro groups. Compounds of the present invention may also be reduced to form silicon compounds containing amine groups attached to silicon through aliphatic carbon.

The following examples are given to further illustrate the invention and are not by way of limitation.

*Example 1*

Silver nitrite (123 g.) and anhydrous diethylether (500 ml.) were charged into a 1 liter, 3-necked round-bottomed flask fitted with a thermometer, mechanical stirrer and a reflux condenser. The flask was then immersed in an ice bath and cooled to 0° C. while the flask was flushed with dry nitrogen. Gamma-iodopropyltriethoxysilane (210 g.) was added in ten milliliter increments over a one hour period with stirring while the temperature was maintained below 5° C. The reaction was then stirred for an additional 60 hours at 0° C. and then stirred an additional 36 hours at 25° C. The reaction mixture was filtered free of the insoluble silver salts to yield a clear colorless filtrate. The filtrate was evaporated at reduced pressure to remove the diethylether leaving a residue. The residue was distilled under reduced pressure through a vigreux column. A nitrogen-containing fraction (B.P. 80° C. to 90° C. at 1.5 mm. of Hg) was obtained. A careful refractionation of the nitrogen-containing fraction gave gamma-nitritopropyltriethoxysilane [O=N—O—CH$_2$CH$_2$CH$_2$—Si(OC$_2$H$_5$)$_3$], B.P. 83° C./0.9 mm. Hg; $n^{25}$ 1.418; $d^{25}$ 1.066 g./cc. and gamma-nitropropyltriethoxysilane [O$_2$N—(CH$_2$)$_3$Si(OC$_2$H$_5$)$_3$], B.P. 88° C./0.8 mm. Hg; $n^{25}$ 1.4210; $d^{25}$ 1.039 g./cc.

The identity of the products was established by elemental and infra-red analysis.

Gamma-nitropropyltriethoxysilane had absorption bonds in the infra-red spectrum at 6.43 microns and 7.24 microns but showed no absorption at 6.13 microns where a normal nitrito group would absorb.

Gamma-nitritopropyltriethoxysilane shows very strong absorption in the infra-red spectrum at 6.13 microns which is to be expected of a nitrito group.

Chemical elemental analysis confirmed the products to be gamma-nitropropyltriethoxysilane and gamma-nitritopropyltriethoxysilane.

*Example 2*

Gamma-nitropropyltriethoxysilane was added to a mixture of diethyl ether and ice containing approximately 1.5 cc. of 0.1 N hydrochloric acid with stirring. The ethereal layer was decanted and the ether and any low boiling material was removed by vacuum evaporation leaving a solid residue of gamma-nitropropylpolysiloxane. An attempt to further dry the gamma-nitropropylpolysiloxane under a vacuum resulted in an explosion when the temperature reached approximately 200° C.

*Example 3*

Gamma-nitritopropyltriethoxysilane was added to a mixture of diethylether and ice containing approximately 1.5 cc. of 0.1 N hydrochloric acid with stirring. The ethereal layer was decanted and the ether and any low boiling material was removed by vacuum evaporation leaving a solid residue of gamma-nitritopropylpolysiloxane. An attempt to further dry the gamma-nitritopropylpolysiloxane under a vacuum resulted in an explosion when the temperature reached approximately 80° C.

*Example 4*

A mixture of gamma-nitropropyltriethoxysilane and gamma-nitritopropyltriethoxysilane was added to a mixture of diethylether and ice containing approximately 1.5 cc. of 0.1 N hydrochloric acid with stirring.

The ethereal layer was decanted and the ether and any low boiling material was removed by vacuum evaporation leaving a solid residue of a polysiloxane containing gamma-nitropropyl and gamma-nitritopropyl units. An attempt to further dry the polysiloxane under a vacuum resulted in an explosion when the temperature reached approximately 150° C.

*Example 5*

3-iodopropyldimethylethoxysilane can be reached with silver nitrite according to the procedures described in Example 1 to yield 3-nitropropyldimethylethoxysilane and 3-nitritopropylmethylethoxysilane.

*Example 6*

4-iodobutylphenyldibutoxysilane can be reacted with silver nitrite according to the procedures described in Example 1 to yield 4-nitrobutylphenyldibutoxysilane and 4-nitritobutylphenyldibutoxysilane.

*Example 7*

11-iodoundecylmethyldiethoxysilane can be reacted with silver nitrite according to the procedures described in Example 1 to yield 11-nitroundecylmethyldiethoxysilane and 11-nitritoundecylmethyldiethoxysilane.

*Example 8*

3-iodopropylpentamethylcyclotrisiloxane can be reacted with silver nitrite according to the procedure described in Example 1 to yield 3-nitropropylpentamethycyclotrisiloxane and 3-nitritopropylpentamethylcyclotrisiloxane.

*Example 9*

4-iodobutylnonamethylcyclopentasiloxane can be reacted with silver nitrite according to the procedures described in Example 1 to yield 4-nitrobutylnonamethylcyclopentasiloxane and 4-nitritobutylnonamethylcyclopentasiloxane.

What is claimed is:

1. An organosilicon compound containing at least one silicon atom and at least one group of the formula:

wherein Z is a member of the class consisting of nitrito and nitro groups, $(a)$ is an integer of from 3 to 18, $(n)$ is an integer of from 1 to 3, each silicon atom is bonded to from 1 to 3 oxygen atoms, said silicon bonded oxygen atoms being bonded to no other atoms than a silicon atom and a carbon of an alkyl group and each remaining unfilled valence of silicon being satisfied by no other groups than monovalent hydrocarbon radicals.

2. An organosilane of the formula:

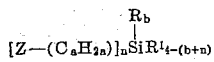

wherein R is a monovalent hydrocarbon radical, $R^1$ is an alkoxy group, Z is a member of the group consisting of nitro and nitrito groups, $(a)$ is an integer of from 3 to 18, $(b)$ is an integer of from 0 to 2 and $(n)$ is an integer of from 0 to 3 and the sum of $(n)$ and $(b)$ is never greater than 3.

3. An organosiloxane comprised essentially of units of the formula:

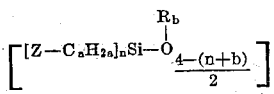

wherein R is a monovalent hydrocarbon radical, Z is a member of the group consisting of nitro and nitrito groups, $(a)$ is an integer of from 3 to 18, $(b)$ is an integer of from 0 to 2, $(n)$ is an integer of from 1 to 3 and the sum of $n$ and $b$ is never greater than 3.

4. A cyclic organosiloxane of the formula:

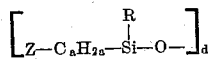

wherein R is a monovalent hydrocarbon radical, Z is a member of the group consisting of nitro and nitrito groups, $(a)$ is an integer of from 3 to 18, and $(d)$ is an integer of from 3 to 7.

5. A linear organosiloxane comprised essentially of units of the formula:

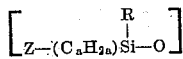

wherein R is a monovalent hydrocarbon radical, Z is a member of the group consisting of nitro and nitrito groups and $(a)$ is an integer of from 3 to 18.

6. An organosilicon compound comprised essentially of units of the formulas:

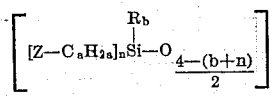

and

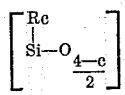

wherein R is a monovalent hydrocarbon radical, Z is a member of the group consisting of nitro and nitrito groups, $(a)$ is an integer of from 3 to 18, $(b)$ is an integer of from 0 to 2, $(n)$ is an integer of from 1 to 3, $(c)$ is an integer of from 0 to 3 and the sum of $(n)$ and $(b)$ is never greater than 3.

7. 3-nitritopropyltriethoxysilane.

8. 3-nitropropyltriethoxysilane.

9. A process for producing an organosilicon compound containing at least one group of the formula:

wherein Z is a member of the class consisting of nitro and nitrito groups, $(a)$ is an integer of from 3 to 18, $(n)$ is an integer of from 1 to 3, the silicon atom is attached to from 1 to 3 oxygen atoms, said oxygen atoms being bonded to no other atoms than a carbon atom of an alkyl group and a silicon atom and each remaining unfilled valence of silicon being satisfied by no other groups than a monovalent hydrocarbon group, which comprises reacting a metal nitrite selected from the class consisting of the nitrites of the metals of groups I–a and I–b of the periodic table with a silicon compound containing at least one unit of the formula:

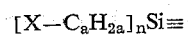

wherein X is halogen and $(a)$, $(n)$ and the unfilled valences of silicon are satisfied as above, in the presence of a liquid organic compound at a temperature below about 50° C.

10. A process as claimed in claim 9 wherein the temperature is from 0° C. to about 25° C.

11. A process for producing 3-nitropropyltriethoxysilane and 3-nitritopropyltriethoxysilane which comprises reacting 3-iodopropyltriethoxysilane with silver nitrite in the presence of a liquid organic compound while maintaining the temperature of the reaction at from about 0° C. to about 25° C.

References Cited in the file of this patent

UNITED STATES PATENTS 2,756,246    Burkhard            July 24, 1956

OTHER REFERENCES

Novak: "Chem. Abstracts," vol. 53 (1959), p. 6063–4.